United States Patent Office 3,420,933
Patented Jan. 7, 1969

3,420,933
ORAL LARVICIDAL COMPOSITION CONTAINING BACILLUS SPHAERICUS
Helmuth Cords, Princeton, N.J., and Carlos A. White, Shafter, Calif., assignors to International Minerals & Chemical Corporation, a corporation of New York
No Drawing. Filed Aug. 31, 1965, Ser. No. 484,108
U.S. Cl. 424—84                     12 Claims
Int. Cl. A01n 15/00

ABSTRACT OF THE DISCLOSURE

An insecticidal composition useful in the control of water-inhabiting larvae consists of granules of a material such as vermiculite containing spores of Bacillus sphaericus and an attractant or bait. A portion of the granules must be dense enough to sink below the surface of the water and strong enough to maintain their physical integrity for a period of time such as 12 hours in water. The granules may be made by coating vermiculite with the Bacillus spores and an attractant such as yeast.

---

The present invention relates to a novel insecticidal composition advantageously useful in the control and/or eradication of water-inhabiting insect larvae, and more particularly to a novel and useful insecticidal composition which contains an oral larvicide for the control of water-inhabiting insect larvae. It will be understood that the phrase "oral larvicide" as employed herein in the specification and claims is intended to refer to a substance which displays toxic characteristics upon being ingested by insect larvae via the oral route. The invention also relates to a method for controlling pests, such as mosquitoes, gnats, midges, and the like, utilizing the new insecticidal formulation.

The natural breeding habitat of the larvae of mosquitoes, gnats, midges, and the like, is in water reservoirs and consequently attempts to control populations of such larvae have concentrated upon treatments of ponds, lakes, river backwater and the like areas. Such previous attempts essentially have entailed the utilization of formulations containing contact insecticides, i.e., materials which display insecticidal properties when they are contacted by the exterior of insects. The approaches heretofore available to the control of such water-inhabiting insects, however, have not proven to be completely satisfactory due to factors involving the nature and characteristics of the contact insecticides or poisons themselves.

The efficient utilization of a contact insecticide in an attempted control or eradication of insect larvae in insect-infested water reservoirs depends upon an ability to bring the insecticide into contact at a relatively high frequency with the larvae present. Although insect larvae spend a considerable proportion of their time in a reservoir below the surface thereof, the physiological requirements of the larvae dictate that the larvae frequently surface to obtain oxygen. It is this oxygen requirement of insect larvae to which an efficient use of contact insecticides has had to be tailored. To this end contact insecticides have been employed in treatments of insect larvae-infested reservoirs in the form of formulations such as dusts, dispersions, and the like, which, when applied to the reservoirs, float on the surface thereof. The required use of the contact insecticides in this "floatable" form, however, has created serious problems to an accurate and efficient dissemination of the insecticidal formulations in that during and after the application of the formulations to a water reservoir surface, wind and water currents interfere substantially with the desired uniform placement and maintenance of the insecticide on the surface areas. Moreover, the dissemination-interfering wind and water currents encountered in the application of such contact insecticides, in many instances, also undesirably cause the insecticidal formulation to drift into adjoining land areas and effect damage to desirable vegetation and/or animal life.

In addition to the problems attendant the attempts to provide an effective uniform application of such contact insecticides to the surface of insect larvae-infested reservoirs, such contact insecticides suffer from the greater disadvantage of not being selective in their toxicity characteristics merely to the insects desired to be controlled. Hence, the utilization of such contact insecticides heretofore has not been completely satisfactory, even when effective application to reservoir surfaces is obtained, due to pollution which impairs the existence of desirable vegetation and fish and animal life, by virtue of their non-selective toxic properties.

Accordingly, it is a primary object of the invention to provide a new and useful insecticidal composition.

It is another object of the present invention to provide a novel larvicidal composition which is adaptable to conventional application techniques for disseminating it accurately in insect larvae-infested water reservoirs.

It is a further object of the present invention to provide a novel larvicidal formulation which is characterized by an excellent ability to be delivered efficiently, substantially without interference from wind and water currents, to regions of insect larvae-infested water reservoirs at which efficient larvae control is realized.

It is yet another object of the present invention to provide a novel larvicidal composition which efficiently and accurately may be applied to larvae-infested water reservoirs at areas in which excellent control and/or eradication of the insect larvae pest is obtained due to the natural habits of the larvae.

A further object of the present invention is to provide a novel larvicidal formulation which is characterized by an ability to deliver and maintain toxic levels of an oral larvicide to natural pest feeding sites in insect larvae-infested water reservoirs.

It is an additional object of the present invention to provide a novel insecticidal composition containing an oral larvicide which is highly selective in its toxicity toward the insect pest desired to be controlled and/or eradicated, e.g., mosquito larvae.

Yet another object of the present invention is to provide a novel granular insecticidal composition containing a microbial oral larvicide, which composition displays significantly improved efficiently in the control and/or eradication of mosquitoes and other insects in their natural breeding water environments.

Still another object of the present invention is to provide a novel granular insecticidal composition comprising a microbial oral larvicide, which granular composition advantageously is adapted to be efficiently applied to control-susceptible areas of insect larvae-infested water reservoirs, provide increased levels of selectively toxic larvicide at such control-susceptible areas, and in some cases, due to unique growth characteristics of the microbial larvicide, provide a continuing insect control expedient in water reservoirs treated therewith.

Broadly described, the present invention provides an insecticidal composition comprising granules of a water-insoluble inert solid carrier containing an effective amount of an oral larvicide, at least a portion of said granules being non-buoyant in water and having the ability to retain their granular physical integrity in water for a time period of at least about 30 minutes, preferably at least about 12 hours. It will be understood that the term "nonbuoyant" as employed herein is intended to refer to a granular solid which has a density greater than water and which, although inherently being characterized by buoyant properties when placed in water in accordance with the fundamentals of Archimedes' principle, characteristically when placed in a water reservoir does not float on the surface and is observed to sink relatively rapidly to the reservoir bottom.

In a more preferred embodiment of the invention there is provided an insecticidal composition comprising substantially dry granules of a mixture comprising insect pathogenic spores of *Bacillus sphaericus* and a water-insoluble solid carrier which is inert with respect to said spores, at least about 20% by weight of said granules being nonbuoyant in water and having the ability to retain their granular physical integrity in water for a time period of at least about 30 minutes.

In certain other embodiments of the invention there are provided insecticidal compositions of the above-described type wherein the mixtures constituting the granular materials contain, in addition to the oral larvicide and solid carrier, a substance which functions to attract insect larvae to the insecticidal granules and enhances the attractiveness of the granules for oral consumption by the larvae.

By means of the present invention there is provided a larvicidal formulation which advantageously provides more efficient results in terms of water-inhabiting insect control and eradication as compared to contact insecticide formulations heretofore proposed. By virtue of their being at least in part in the form of relatively heavy granules, the compositions of the present invention can be more accurately delivered to and maintained at the desired regions of insect-infested environments in that heretofore troublesome effects of wind and water currents are greatly minimized. Moreover, by virtue of their described granular characteristics, the compositions of the invention advantageously are characterized by an ability to concentrate a substantial portion of their larvicidal potential at the bottom of insect-infested water reservoirs where larvae feeding predominates and consequently maximum insect-control susceptibility obtains. Furthermore, in its embodiments wherein the larvicide is the described microbial larvicide or pathogen, the invention provides a highly advantageous means of delivering highly efficient levels of toxically-selective oral larvicide to the precise areas of insect-infested water reservoirs at which maximum control is obtained without any detrimental effects to other species of fish, plant or animal life. For example, by virtue of their being in such granular form, embodiments of such microbial larvae pathogen-containing compositions provide up to and over a ten-fold increase in mosquito control levels as compared to the microbial insect pathogens themselves when employed in nongranular form.

As the larvicidal ingredient, the invention contemplates the utilization of any chemical or microbiological compound or microorganism which is toxic with respect to insect larvae when administered through the oral route. Chemical compounds which are such oral larvicides and which suitably may be employed in the compositions of the invention include biological alkylating agents, e.g., aziridine derivatives such as 2,2,4,4,6,6-hexabis-(1-aziridinyl) - 1,1,3,5,2,4,6 - triazatriphosphorine and antimetabolides such as 5-fluorouricil and methotrexate. While such chemical oral larvicides suitably may be employed in certain embodiments of the granular compositions of the invention, they are the least preferred larvicides due to their relative nonselective toxic properties as compared to those of the microbiological compounds and microbial larvicides.

Specific examples of microbiological compounds suitable for use as the oral larvicides in the formulations of the invention include the water-insoluble and water-soluble crystals and compounds produced by crystalliferous microorganisms such as *Bacillus thuringiensis*, *Bacillus sotto*, and *Bacillus entomocidus*. Specific examples of additional crystalliferous microorganisms which produce such microbiological compounds as well as methods for preparing and recovering same are disclosed, inter alia, in U.S. Patent No. 3,087,865.

In the preferred embodiments of the compositions of the present invention the oral larvicide is a microorganism which has the ability to "poison" or "infect" the larvae at one or several stages of its development. The particularly preferred microbial oral larvicide is provided by spores of a strain of *Bacillus sphaericus* which has the characteristics of mortally infecting aquatic insect larvae, such as mosquitoes.

The strain of *Bacillus sphaericus* employed in the more preferred granular formulations of the invention is an insect pathogenic strain of *Bacillus sphaericus*, Bioferm strain No. 596, having the identifying characteristics set forth in the following table (which correspond to those listed for *Bacillus sphaericus* in Bergey's Manual of Determinative Bacteriology, 7th Ed., 1957).

TABLE

| Classification designation | Identifying characteristics |
|---|---|
| Genus: Bacillus | Gram variable, catalase positive, aerobic spore former. |
| Specie: sphaericus | Sporangium swollen by a spherical spore; spore terminal to subterminal; growth on ordinary laboratory medium (nutrient agar) at pH 6.0-8.0; growth in 4% NaCl broth; hydrolyzes gelatin; no acetyl methyl carbinol produced (negative Voges-Proskoner); no fermentation of sugars, or starch; no reduction of nitrate; urea not necessary for growth. |

Further identifying characteristics of the insect larvae pathogenic strain of *Bacillus sphaericus* preferred for use are the following:

(a) Pathogenic for the larvae of mosquitoes, gnats, and midges.
(b) Nonpathogenic for housefly, lucerne moth and wax moth.
(c) Nontoxic to mice, rats and fish.
(d) Produces urease.
(e) Growth at pH 6.0.
(f) No growth in 10% NaCl.
(g) Biotin and thiamin required for growth.
(h) Produces phospholipase A.
(i) Reduces methylene blue in 72 hours.

In accordance with the present invention the microorganism, preferably the spores of insect-pathogenic *Bacillus sphaericus*, utilized as the larvicide in the formulation advantageously may have been prepared by any suitable technique. The invention contemplates using larvicidal microorganism cells, spores which previously have been released from the parent cells in which they were formed, spores which upon their incorporation into the formulations of the invention remain attached in the sporangium of the parent cell, and mixtures thereof. At the time of their incorporation into the formulations of the invention the microbial larvicide employed, preferably spores or spore-containing cells on *Bacillus sphaericus* suitably may be in a form resulting from its having been recovered from an appropriately cultured final whole culture of the microorganism by any conventional recovering technique such as screening, centrifuging, evaporative drying, freeze drying, adsorption with a solid adsorbent or filter aid, solvent extraction, grinding, milling and the like or a combination of such recovery expedients.

In a typical fermentation technique for preparing the *B. sphaericus* spore-containing larvicide preferred for use in the compositions of the invention, the microorganism is grown under submerged aerated conditions in an aqueous medium containing an assimilable carbon source, an assimilable nitrogen source, and essential minerals and vitamins. Specific examples of suitable media include those wherein the carbon and nitrogen sources are supplied together by a complex proteinaceous material such as casein, cottonseed oil meal, soybean oil meal, fish meal and mixtures thereof or by monomeric amino acids such as arginine, proline and glutamic acid. In the fermentation biotin and thiamin constitute required vitamin nutrients. These essential vitamins may be supplied as constituents of complex carbon and nitrogen sources, e.g., complex proteinaceous materials and/or may be added separately. The fermentation medium further contains minor amounts of secondary nutrient minerals such as calcium, magnesium, and manganese, and usually trace amounts of zinc, iron, cobalt, nickel and the like, which minerals are added either singly in the form of chlorides, bromides, nitrates, sulfates, phosphates and the like or as constituents of the aforedescribed complex carbon and nitrogen sources.

A more preferred embodiment of a production fermentation medium which may be employed in the production of a Bacillus sphaericus larvicide is constituted by an aqueous medium containing from about 0.1 to about 5% fish meal, from about 0.1 to about 5% soybean oil meal, from about 0.05 to about 0.2% calcium carbonate, from about 0.005 to about 0.02% calcium chloride, from about 0.0005 to about 0.002% thiamin, and from about 0.00005 to about 0.0002% biotin.

In the fermentation procedure usually employed a suitable medium of the above type initially is adjusted to a pH of from about 7 to about 8 by the addition of sodium, potassium or ammonium hydroxide and then sterilized at about 120° C. for 15 to 25 minutes. The sterilized medium then is inoculated with at least about 0.15% by volume of an inoculum of the insect pathogenic strain of *B. sphaericus* in which the cells are in the vegetative stage of growth. A suitable inoculum may be prepared by a technique which entails, for example, transferring one loop of a nutrient agar slant of the microorganism after incubation for about 48 hours at about 30° C. to about 100 milliliters of an aqueous brain-heart infusion broth containing biotin and thiamin, incubating the resultant transfer for about 16 to about 24 hours at about 30° C. while subjecting it to agitation, then transferring the resultant culture to about one liter of the production fermentation medium, and incubating the resultant stepped-up medium at about 30° C. from about 8 to about 10 hours while subjecting it to agitation.

The inoculated production fermentation medium then is maintained at a temperature of from about 25 to about 35° C. under aerated submerged conditions for a time period requisite for the *B. sphaericus* cell population to grow and finally undergo at least partial sporulation. Generally, the time periods employed are in the range of from about 10 to about 36 hours, preferably from about 12 to about 24 hours. Under such conditions final whole cultures of *B. sphaericus* usually are produced containing from about $0.1 \times 10^9$ to about $5 \times 10^9$ cells per milliliter with over about 5%, more usually over about 20%, preferably at least about 90%, of the total cells present having formed spores.

As described above, the microbial larvicide used in the present compositions may be recovered from a final whole culture production medium by any suitable technique. In accordance with the preferred embodiments of the present invention wherein the larvicide is provided by insect pathogenic spores, e.g., spores of *B. sphaericus*, the spore pathogen employed is in the form of an undried or dried cell cream or sludge recovered from a final whole culture. Such cell creams satisfactorily may be obtained by the use of any conventional solid-liquid separation method with or without the utilization of filtering aids, chemical flocculants, and the like. In embodiments wherein the larvicide is provided by spores of *B. sphaericus* particularly suitable cell creams are those which result from a treatment involving an initial screening of the final whole culture to remove solids having a particle size greater than about 200 mesh, an adjustment of the pH of the screened culture to a level of from about 2.5 to about 4 with an acid such as sulfuric acid or hydrochloric acid, and a subsequent centrifuging of the resultant pH adjusted medium to effect a removal of up to and over about 80% by volume of the aqueous phase. Such cell creams usually have a solids content in the range of from about 4 to about 20% by weight and a spore count in the range of from about $10 \times 10^9$ to about $100 \times 10^9$ spores per milliliter. The cell cream, as described hereinafter, may be used in this form in the preparation of formulations of the invention or preliminary to its incorporation may be subjected to further treatment including a drying step. In certain of the preferred embodiments of the invention the spore-containing oral larvicide is in the form of the solid material obtained by initially vacuum drying, at a temperature preferably below about 40° C., the cell cream or sludge recoverable from a final whole culture of the above-described strain of *Bacillus sphaericus* and subsequently comminuting the resultant vacuum-dried material in a micropulverizer and the like apparatus. Such vacuum-dried and micropulverized cell creams usually contain from about $5 \times 10^{10}$ to about $75 \times 10^{10}$ viable spores per gram and have a particle size of about $-100$ mesh.

Solid carriers which are contemplated for use in the compositions of the invention are any solid inorganic or organic essentially water-insoluble materials which are inert with respect to the larvicidal constituent. Specific examples of suitable materials for use as the solid carrier include without limitation carbonates, such as chalk, and aluminaceous, siliceous, and aluminosiliceous materials such as alumina, quartz, talc, kaolinite, attapulgite, olanchite, montmorillonite, bentonite, vermiculite, mica, diatomaceous earth, fuller's earth, and the like. While the utilization of materials which themselves have insecticidal properties are contemplated for use, the materials constituting preferred carriers display an absence of toxic properties. More particularly preferred for use as the solid carrier is an aluminosilicate such as attapulgite, olanchite, bentonite, or vermiculite. At the time of its combination with the larvicide ingredient employed in the formulations of the present invention the solid carrier preferably is in the preformed granules or a powder, depending upon the particular mode utilized in preparing the larvicidal granules as described below.

While in its broadest aspects the present invention contemplates granules of formulations consisting only of the oral larvicide with the solid carrier, in certain embodiments of the compositions, also present in the formulation from which the granules are formed, is a substance which increases the attractiveness of the granules to insect larvae pests. Such attractants suitably may perform the desired attracting or baiting function by appealing to the sight, scent, smell, taste, and the like senses of the larvae. The more preferred attractants enhance the palatability of the larvicidal granules and include cattle manure and proteinaceous materials such as yeast, fish meal, soluble soybean protein and the like. When utilized, the attractant ingredient or bait generally is present in an amount of from about 0.5 to about 10% by weight of the granule formulation.

The invention contemplates embodiments wherein additional adjuvants such as wetting agents, waterproofing agents, binders, and the like, also are present in the formulation formed into the larvicidal granules. The use of such materials is within the skill of the routineer.

The invention contemplates the utilization of any conventional technique in preparing the larvicidal granules. The ingredients suitably may be combined in any form with any order of addition being employed in the formulation. In method the granules of the invention may be produced by depositing, such as by spraying, immersing, and the like, a suspension or solution of the oral larvicide, preferably a larvicidal spore-containing cell cream of the above-described type, onto the surface of the solid carrier material which previously had been placed into a non-buoyant granular form and then drying the resultant granules. Another manner of preparing the larvicidal granules of the invention involves admixing a suspension or solution of the larvicide, again preferably a spore-containing cell cream of the above-described type, with powdered solid carrier ingredient, usually in the presence of additional water, and forming nonbuoyant granules from the resultant mixture. In another method for preparing the granules of the invention, the larvicide in powdered form, preferably a spore-containing cell cream powder of the above described type, is admixed with a powder of the solid carrier ingredient, usually in the presence of additional water, and the resultant admixture then is formed into substantially dry nonbuoyant granules. An attractant and/or other adjuvants suitably may be added to the granule formulation alone or in combination with either the larvicide ingredient, the solid carrier, or with water added to aid the formulation and/or granulation-forming operation. While only water is mentioned above as a formulating aid, it will be understood that other liquids, preferably volatile liquids, suitably may be added to the formulation as a mixing and/or granulation-aiding expedient. The actual granulation step employed in the preparation of the larvicidal granules of the invention suitably may entail any conventional technique involving agglomerating, compacting and/or densifying appropriate formulations in a rotary drum, tray drier, or pressure-applying device such as an extruder, molding machine, and the like apparatus.

The granulation step, whether carried out preliminarily on larvicide-free solid carrier or on larvicide-carrier admixtures, preferably is such as to provide a non-buoyant granule which, when placed in water, does not disintegrate substantially and retains its granular physical integrity for time periods of at least about 30 minutes, preferably at least about 12–24 hours and ranging up to about 4 days and even several weeks. A subsequent drying step, when employed in the embodiments wherein the pathogenic spores are present as the larvicide, preferably is carried out under vacuum at a temperature below about 40° C. to preclude a loss in the viable spore count of the granular materials.

In accordance with the invention the actual particle size of the granules will vary depending upon, inter alia, the nature of the particular solid carrier, the granulation technique employed in the preparation thereof, and the manner desired to be utilized in the ultimate dissemination of the granular formulation in insect-infected environments. Usually, the nonbuoyant granules have a particle size in the range of from about 5 to about 60 mesh and, where needed, the formulations are subjected to a screening to provide such particle characteristics.

While the invention contemplates embodiments wherein all of the insecticidal composition is in the form of the above-described nonbuoyant granules, in preferred embodiments the compositions contain mixtures of such nonbuoyant granular materials and particles of the same basic formulation which are buoyant and float on the surface when deposited in water for time periods of at least about 12 hours, preferably from about 18 to about 36 hours. By the use of such buoyant larvicidal particles in the composition of the invention, provision is made for those instances wherein insect larvae happen to feed at the surface of a water reservoir which is treated in accordance with the invention. In these mixtures of buoyant and nonbuoyant particles, the nonbuoyant granules usually constitute at least about 20%, and preferably at least about 50%, by weight of the particle mixture.

The actual amount of the larvicide ingredient present in the larvicidal formulations of the invention suitably may vary over a relatively wide range. In instances wherein the larvicide is a chemical or microbiological compound, the larvicide is present usually in an amount in the range of from about 0.1 to about 10% by weight of the granule formulation. For embodiments wherein the larvicide is provided by microorganism cells or spores, preparation mixing ratios usually are employed which provide final products containing from about $0.01 \times 10^{10}$ to about $50 \times 10^{10}$, preferably from about $0.1 \times 10^{10}$ to about $10 \times 10^{10}$, cells or spores per gram of granular material.

The insecticidal compositions of the invention advantageously are effective for the control and eradication of aquatic insect larvae, such as those of mosquitoes, gnats, and midges. Specific examples of such aquatic insect larvae include those of *Culex pipiens, Aedes sierrensis, Anopheles freeborni, Anopheles albimanus, Aedes taeniorhynchus, Culex tarsalis,* and *Chaoborus astictopur.*

The granular compositions of the invention advantageously are adapted to be easily packaged, handled, and disseminated. In the ultimate dissemination of the formulations into the desired insect-infected areas any conventional application technique may be employed. Due to their granular characteristics, the compositions excellently are suited for efficient and accurate application to infested water reservoirs such as ponds and the like from airplanes. In the dissemination of the compositions of the invention the amount to area distribution ratio suitably will vary over a wide range depending upon, inter alia, the particular composition of the formulations employed, the particular insect pest desired to be controlled, and the particular nature of the water reservoir in which control is desired to be achieved. Distributions generally are in the range of from about 0.25 to about 2 grams per square foot of reservoir surface area, although both higher and lower distribution ratios may be utilized.

The invention having been described in detail, the following examples are presented to show specific embodiments of the compositions and methods of using same. It will be understood that the examples are given merely for illustration purposes and not by way of limitation.

EXAMPLE I

(A) Preparation of spore pathogen

A culture of the above-described mosquito pathogenic strain of *Bacillus sphaericus,* Bioferm Culture Collection No. 596, was grown for about 48 hours at about 30° C. on an agar slant of brain-heart infusion in tap water. One loop of the resultant culture then was employed to inoculate about 100 milliliters of a sterilized aqueous medium containing about 3.7 grams brain-heart infusion broth, about 0.0001 gram biotin and about 0.001 gram thiamin. This inoculated medium was incubated at about 30° C. for about 16 to 24 hours in a 500 milliliter flask vibrated on a shaker at about 200 r.p.m. At the end of this time period the resultant culture was utilized to inoculate about 1 liter of a sterilized aqueous production fermentation medium and the inoculated stepped-up medium was incubated at about 30° C. for about 8 to 10 hours in an agitated 6 liter flask. The production fermentation medium employed had the following composition:

| Ingredient— | Amount, percent |
|---|---|
| Soybean meal | 1.0 |
| Fish meal | 1.0 |
| Thiamin | 0.001 |
| Biotin | 0.0001 |
| $CaCO_3$ | 0.1 |
| $CaCl_2$ | 0.01 |

This medium then was employed as the inoculum for about 100 gallons of the production fermentation medium which preliminarily had been sterilized and adjusted to a pH of about 7.8 by the addition of sodium hydroxide. The inoculated production medium was maintained at a temperature of about 30° C. for a time period of about 24 hours. At the end of this period the final whole cuture was screened to remove solids greater than about 200 mesh and the resulting screened culture was treated with 20% sulfuric acid to adjust the pH to about 3.0. The acidified culture then was subjected to centrifuging to remove about 85% of its volume as effluent aqueous liquor and obtain a cell cream having a solids content of about 12% and a spore count of about $8 \times 10^{10}$ spores per milliliter. Recovery of viable spores in the centrifuging step was about 99%.

A portion of the cell cream obtained was set aside for utilization in that form. Another portion of the cell cream was converted into a cell cream powder by initially drying it under a vacuum of about 23 inches mercury and then comminuting the resultant dried cream in a micropulverizer to about 200 mesh. The dried cell cream powder was characterized by a spore count of about $50 \times 10^{10}$ to $60 \times 10^{10}$ spores per gram.

(B) Preparation of granular insecticidal composition

Granular formulations were prepared by initially spraying the surface of vermiculite granules having a particle size in the range of from about 10 mesh to about 60 mesh with each of (1) the above-described nondried cell cream, (2) the above-described nondried cell cream containing yeast as an insect attractant, and (3) the above-described nondried cell cream containing cattle manure as an insect attractant. The resultant materials then were subjected to vacuum drying at about 40° C. to provide granular materials containing about $0.1 \times 10^{10}$ spores of the insect pathogenic *B. sphaericus* per gram of granular material and in the two instances wherein an attractant was employed, about 1% by weight attractant.

(C) Treatment of mosquitoes with granular insecticidal composition

In order to determine the larvicidal characteristics of the granules prepared in (B) varying amounts of each of the granules were placed in about 37.5 milliliters of water containing 10 four-day old mosquito larvae (*Culex pipiens*) and the mortality effects were observed after four days. The results of the tests are set forth below in Table 1. The unit "mg. percent" employed in presenting the mortality effects represents the milligrams of cell cream solids per 100 milliliters of assay water which, as determined by the serial additions of the granular formulations, were required to effect the indicated 50% or 90% levels of insect kill.

TABLE 1

| Formulation | $LD_{50}$ (mg. percent) | $LD_{90}$ (mg. percent) |
|---|---|---|
| Non-baited granules (vermiculite, cell cream). | *0.67 | 1.15 |
| Baited granules (vermiculite, cell cream, yeast). | 0.76 | 1.02 |
| Baited granules (vermiculite, cell cream, manure). | 0.84 | 2.15 |

*Lowest level assayed.

EXAMPLE II

In order to compare the effectiveness of the granular compositions of the invention as compared to those of the pathogenic spores themselves and nongranulated spore-containing powders, the general mosquito-treating procedure of Example I was repeated with the exceptions of substituting for the granular formulations of the invention varying amounts of each of (1) the dried cell cream powder of Example I, and (2) an admixture of the dried cell cream powder of Example I and Olancha clay powder containing about $2 \times 10^{10}$ spores of *B. sphaericus* per gram, and the amounts of the materials required to effect a 90% level insect kill were determined. The results of these tests are set forth below in Table 2. For convenience, the results obtained in Example I utilizing the granular formulations of the invention also are included.

Table 2

| Formulation | $LD_{90}$ (mg. percent) |
|---|---|
| Dried cell powder | 12.5 |
| Dried cell cream powder-clay powder admixture | 50 |
| Nonbaited granules (Example I) | 1.15 |
| Yeast-baited granules (Example I) | 1.20 |
| Manure-baited granules (Example I) | 2.15 |

From the tests shown in Table 2 it can be seen that the granular formulations of the invention provide up to and over a ten-fold increase in the effectiveness of the *B. sphaericus* larvicide.

EXAMPLE III

In order to manifest the effectiveness of the granular compositions of the invention in the field, a granular material was prepared by mixing yeast, a sample of the above-described nondried cell cream, and about 100 grams of powdered Olancha clay in a blender, forming the resultant admixture into "noodles" by extrusion through a meat grinder, drying the extruded material at about 40° C. under vacuum, subjecting the dried sample to grinding, and then screening the resultant material to provide a granular material having a particle size distribution in the range of from about 10 to about 20 mesh and containing about 5% by weight yeast and about $2 \times 10^{10}$ spores of *B. sphaericus* per gram. This granular material was subjected to a field test in seepage pools infested with mosquito larvae (*Culex tarsalis*). In these field tests a control pool received no treatment and another pool was treated with the *B. sphaericus* spore-containing granules at a distribution of about 0.75 gram per square foot of pool surface area. Average larvae counts in similar volumes of water dipped from the respective pools initially and after five days were determined. The results of the test are shown in Table 3.

TABLE 3

| Treatment | Larvae count | |
|---|---|---|
|  | 0 days | After five days |
| None (control) | 52 | 80 |
| Baited granules | 100 | 36 |

The results of the field test set forth in Table 3 reveal that while the larvae population in an untreated control pool increased by approximately 60%, treatment with the baited granules of the invention resulted in a reduction in the mosquito population of about 64%.

EXAMPLE IV

The procedure of Example III is repeated with the exceptions of substituting, each in turn, attapulgite and bentonite for the olanchite clay. The results of these tests also show that treatment of mosquite-infested reservoirs with the granular formulations of the invention effect an excellent means of controlling aquatic larvae population.

Other modifications and embodiments of the invention which do not depart from the spirit of the present invention will be apparent to those skilled in the art. Hence, it will be understood that it is intended that the present invention be limited only by the scope of the appended claims.

The embodiments of the invention in which an exclusive property or privilege is claimed are defined as follows:

1. An oral larvicidal composition comprising granules of an essentially water-insoluble inert solid carrier containing about $0.01 \times 10^{10}$ to about $50 \times 10^{10}$ *Bacillus sphaericus* spores per gram, at least 20% of said granules being nonbuoyant in water and having the ability to retain their granular and physical integrity in water for a time period of at least about 30 minutes.

2. The composition according to claim 1 wherein at least about 50% by weight of said granules have said nonbuoyant and physical integrity-retentive properties.

3. The composition according to claim 2 wherein said granules have a particle size within the range of from about 5 to about 60 mesh.

4. The composition according to claim 3 wherein also present in said granules is an insect larvae attractant.

5. The composition according to claim 4 wherein said attractant is yeast.

6. The composition according to claim 4 wherein said solid carrier is an aluminosilicate.

7. A method for controlling aquatic insects which comprises applying to an aquatic insect larvae-infested water reservoir an oral larvicidal amount of a composition comprising granules of an essentially water-insoluble inert solid carrier containing about $0.01 \times 10^{10}$ to about $50 \times 10^{10}$ *Bacillus sphaericus* spores per gram, at least about 20% by weight of said granules being nonbuoyant in water and having the ability to retain their granular physical integrity in water for a time period of at least about 30 minutes, to deliver said nonbuoyant granules to the bottom of said water reservoir and render said granules available to insect larvae feeding at said bottom.

8. The method according to claim 7 wherein at least about 50% by weight of said granules have said nonbuoyant and said physical integrity-retentive properties.

9. The method according to claim 8 wherein said granules have a particle size within the range of from about 5 to about 60 mesh.

10. The method according to claim 9 wherein also present in said granules is an insect larvae attractant.

11. The method according to claim 10 wherein said attractant is yeast.

12. The method according to claim 10 wherein said solid carrier is an aluminosilicate.

References Cited

UNITED STATES PATENTS

| | | |
|---|---|---|
| 3,086,922 | 4/1963 | Mechalas. |
| 3,087,865 | 4/1963 | Drake et al. _____ 167—22 XR |
| 3,137,618 | 6/1964 | Pearce _____ 167—42 |
| 3,194,730 | 7/1965 | Nemec et al. _____ 167—42 |
| 3,271,243 | 9/1966 | Cords et al. _____ 167—22 |
| 3,274,052 | 9/1966 | Yaffe et al. _____ 167—42 |

ALBERT T. MEYERS, *Primary Examiner.*

D. R. MAHANAND, *Assistant Examiner.*

U.S. Cl. X.R.

424—93

UNITED STATES PATENT OFFICE
CERTIFICATE OF CORRECTION

Patent No. 3,420,933                                                      January 7, 1969

Helmuth Cords et al.

It is certified that error appears in the above identified patent and that said Letters Patent are hereby corrected as shown below:

Column 2, line 49, "efficiently" should read -- efficiency --. Column 6, line 38, after "the", first occurrence, insert -- form of --. Column 7, line 44 and column 8, line 13, "infected", each occurrence, should read -- infested --; same column 8, line 24, after "generally" insert -- employed --. Column 9, TABLE 1, last column, line 2 thereof, "1.02" should read -- 1.20 --.

Signed and sealed this 17th day of March 1970.

(SEAL)
Attest:

Edward M. Fletcher, Jr.                            WILLIAM E. SCHUYLER, JR.
Attesting Officer                                                Commissioner of Patents